April 2, 1963  M. MUELLER  3,083,868
MECHANISM FOR FEEDING ICE CREAM CONES OR THE LIKE
Filed April 5, 1960  3 Sheets-Sheet 1
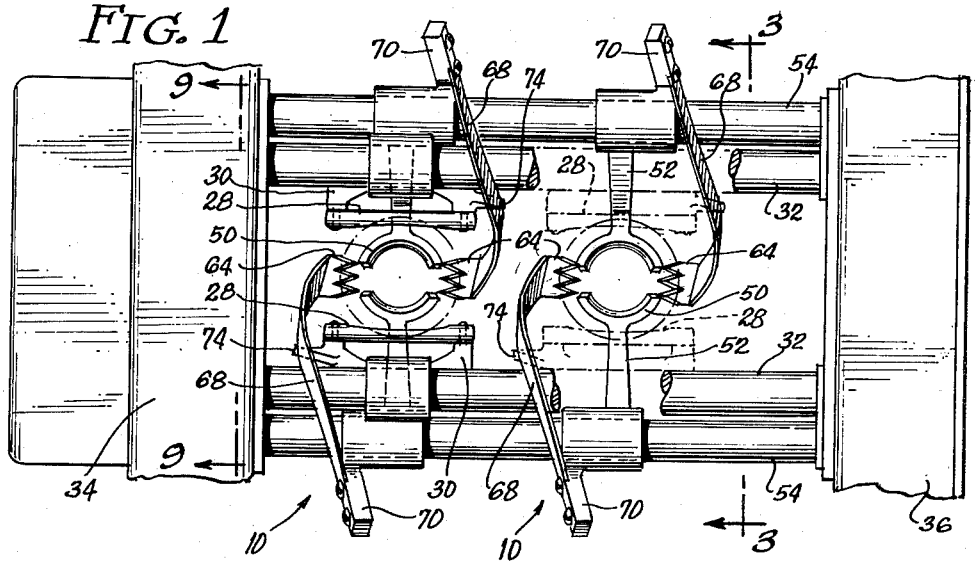
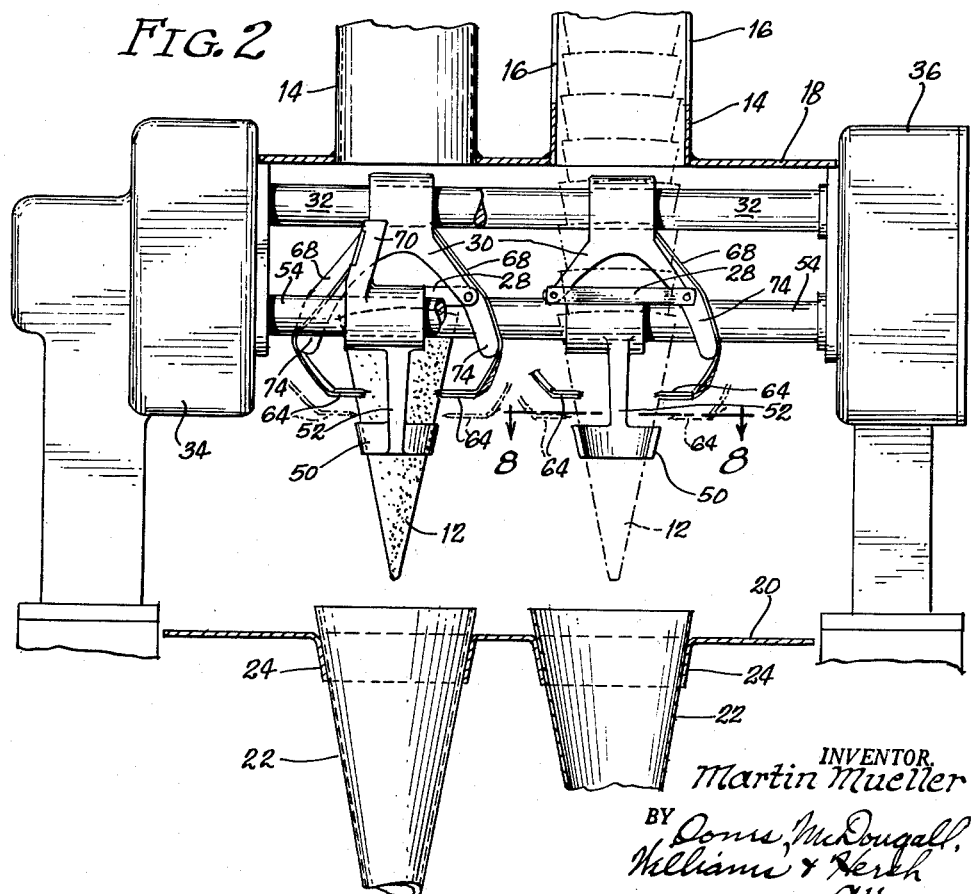
INVENTOR
Martin Mueller
BY
Dawes, McDougall,
Williams & Hersh
Attorneys

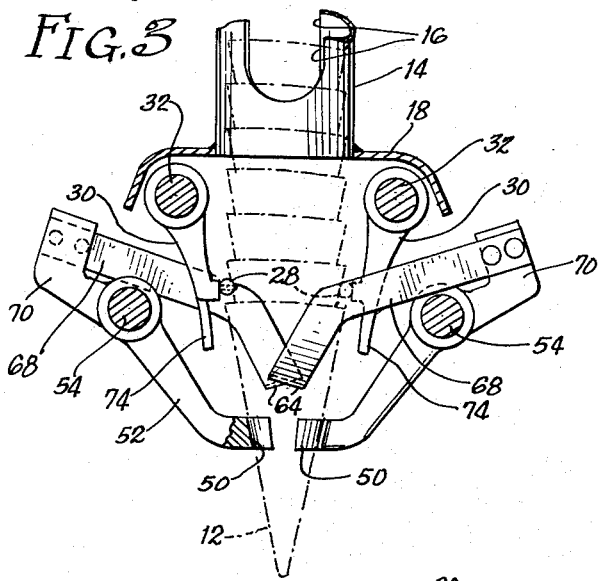
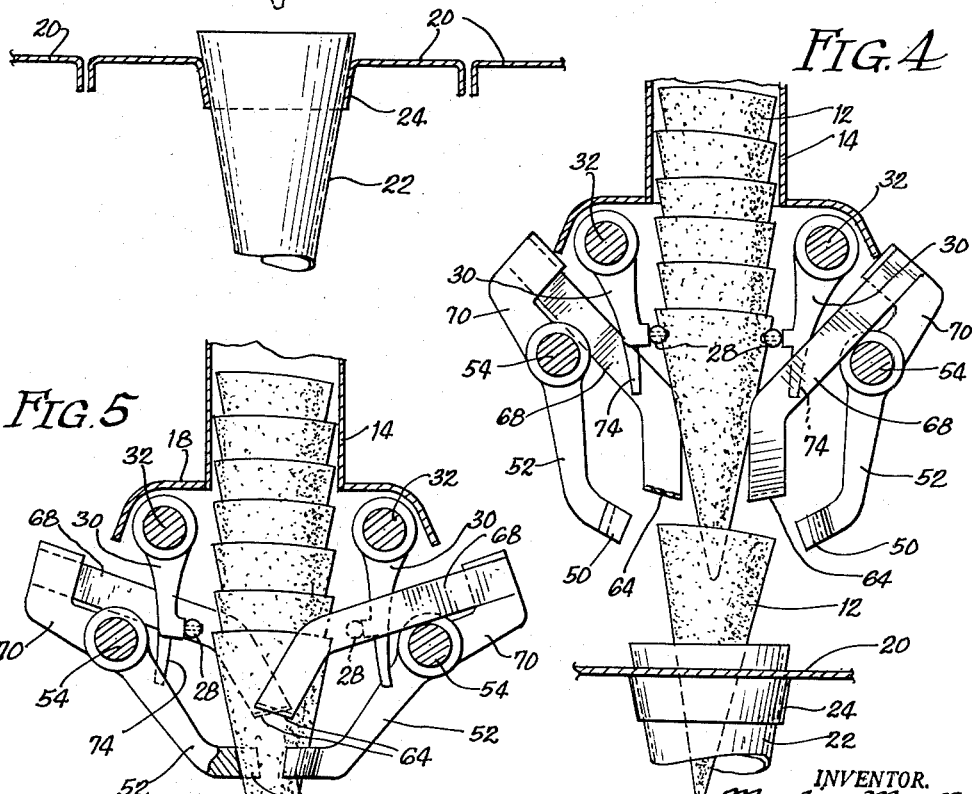
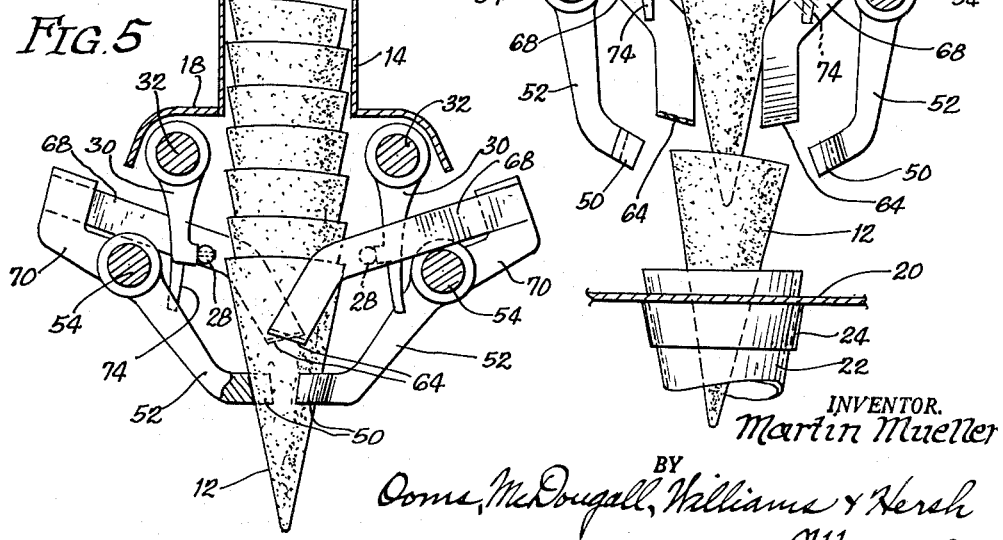

April 2, 1963   M. MUELLER   3,083,868
MECHANISM FOR FEEDING ICE CREAM CONES OR THE LIKE
Filed April 5, 1960   3 Sheets-Sheet 3
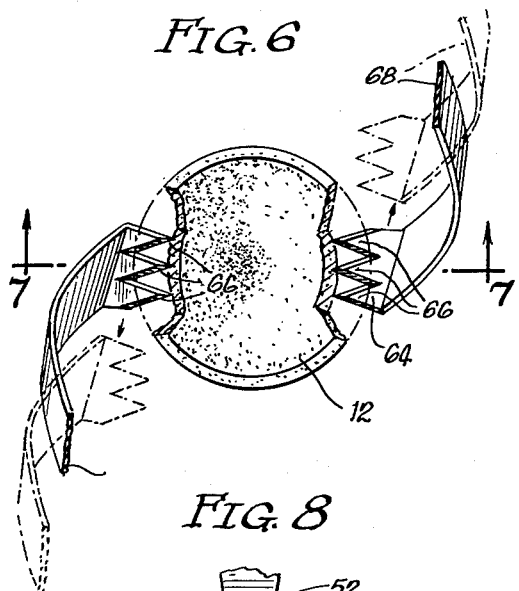
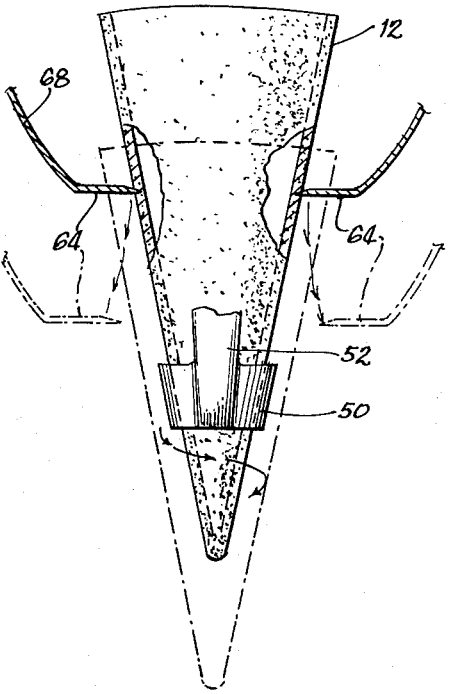
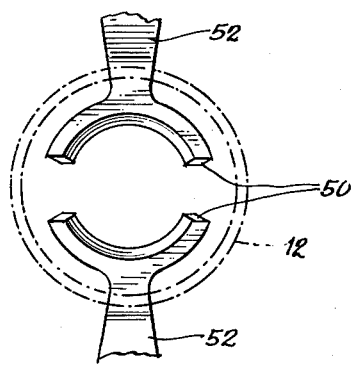
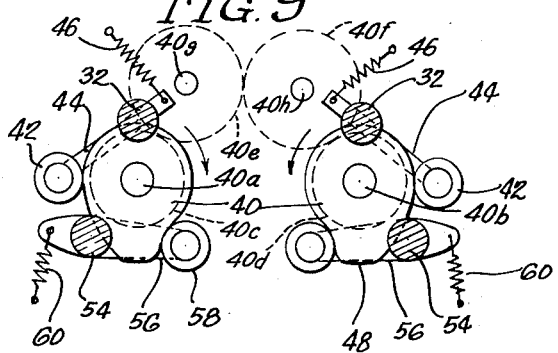
INVENTOR.
Martin Mueller
BY
Ooms, McDougall, Williams & Hersh
Attorneys United States Patent Office 3,083,868
Patented Apr. 2, 1963

3,083,868
MECHANISM FOR FEEDING ICE CREAM CONES
OR THE LIKE
Martin Mueller, Chicago, Ill., assignor to
Seymour C. Graham, Chicago, Ill.
Filed Apr. 5, 1960, Ser. No. 20,072
8 Claims. (Cl. 221—213)

This invention relates to a new and improved mechanism for feeding ice cream cones or similar articles, one by one, from a stack of such cones. The mechanism of the present invention is particularly well adapted for use in a machine for automatically filling the cones with ice cream and packaging the filled cones for shipment and sale.

One object of the present invention is to provide a new and improved mechanism which will separate the ice cream cones in a positive manner from the bottom of the stack of cones, despite the tendency for the cones to stick together in the stack.

A further object is to provide such a new and improved mechanism which will avoid breakage of the cones, despite their highly fragile character.

Another object is to provide a new and improved mechanism adapted to separate ice cream cones, one by one, from the bottom of a stack by turning the lowermost cone about its central axis, relative to the stack, while simultaneously moving the cone downwardly away from the stack.

It is a further object to provide a new and improved mechanism of the foregoing character in which the lowermost cone is turned by a pair of jaws which engage opposite side portions of the cone with a swiping movement, directed peripherally as well as downwardly at an inclined angle.

A further object is to provide a new and improved mechanism of the foregoing character which is not only effective in operation but is also durable and relatively inexpensive.

Further objects and advantages of the present invention will appear from the following description, taken with the accompanying drawings, in which:

FIG. 1 is a plan view showing an ice cream cone feeding mechanism, to be described as an illustrative embodiment of the present invention.

FIG. 2 is an elevational view of the mechanism, with certain parts shown in section.

FIG. 3 is an enlarged fragmentary elevational section, taken generally along a line 3—3 in FIG. 1.

FIGS. 4 and 5 are fragmentary sectional views similar to FIG. 3, but showing the mechanism in successive changed positions.

FIG. 6 is a fragmentary plan view, showing the action of the jaws whereby the lowermost cone is twisted to free it from the bottom of the stack.

FIG. 7 is a fragmentary elevational section taken generally along a line 7—7 in FIG. 6.

FIG. 8 is a fragmentary plan view, taken generally as indicated by the line 8—8 in FIG. 2.

FIG. 9 is a diagrammatic elevational sectional view showing the cam arrangement for operating the cone feeding mechanism, the view being taken generally along a line 9—9 in FIG. 1.

It will be seen that the drawings illustrate a pair of identical mechanisms 10, adapted to feed ice cream cones 12, one by one, from the bottom of a stack of cones. It will be sufficient to describe one of the cone feeding mechanisms 10. While the invention is illustrated in connection with the feeding of ice cream cones, it will be recognized that the invention is applicable to the feeding of various other articles.

It will be seen that an elongated stack of the ice cream cones 12 is adapted to be received in a substantially vertical magazine 14, which comprises a cylindrical tube having longitudinal slots 16 therein to make it easy to load a stack of cones into the magazine. The lower end of the magazine extends through a horizontal plate 18 which supports the magazine.

After being separated from the stack of cones, the lowermost ice cream cone drops onto a suitable conveyor 20. In this case, the cone drops into a conical paper cup 22 which has previously been deposited on the conveyor 20, either manually or by a suitable mechanism, not shown. The conveyor 20 has tapered pockets or openings 24 adapted to receive the paper cups 22 in an upright position.

After the ice cream cone 12 has been deposited on the conveyor 20, the cone may be carried to additional mechanisms adapted to fill the cone with ice cream, cover the ice cream with a syrup or other topping, add nuts or the like to the topping, and cover the ice cream and the upper end of the cone with a wrapper, which may be joined to the upper end of the paper cup 22. These mechanisms are not shown, because the present invention is concerned with the mechanism for feeding the ice cream cones, one by one, from the bottom of the stack of cones.

The cone feeding mechanism 10 comprises a plurality of upper supporting members 28 which are movable against and away from the stack of cones so as to support the stack against downward movement. The members 28 are engageable with the second to the lowermost ice cream cone in the stack, at points spaced a short distance below the lip of such cone. It will be seen that the cones overlap in the stack, so that only the upper portion of the second to the lowermost cone is exposed. It is this upper portion which is adapted to be engaged by the upper supporting members 28. In this case, the upper supporting members 28 take the form of two diametrically opposite bars which may be padded with rubber or other soft material, to avoid any possibility of breaking the cones.

The supporting bars 28 are mounted on arms 30 which extend downwardly from horizontal shafts 32. Two such shafts are provided, on opposite sides of the stack of cones. The opposite ends of the shafts 32 are rotatably mounted in left and right-hand bearing housings 34 and 36.

When the supporting members 28 are to be swung outwardly away from the stack of ice cream cones, the shafts 32 are rotated or rocked by means of a suitable mechanism, which may be contained in the left-hand bearing housing 34. As shown in FIG. 9, such mechanism may comprise a pair of cams 40 which are continuously rotated by a suitable drive. Thus, the cams 40 may be mounted on shafts 40a and 40b to which gears 40c and 40d may be secured. It will be seen that the gears 40c and 40d mesh with gears 40e and 40f, which, in turn, mesh with each other. The gears 40e and 40f are mounted on shafts 40g and 40h. It will be understood that the shaft 40g may be driven by a suitable motor (not shown). Each shaft 32 may be operated by a cam follower 42 which engages one of the cams 40. As shown, each cam follower 42 takes the form of a roller mounted on an arm 44 which is geared to one of the shafts 32. A spring 46 may be connected to the arm 44 to bias the roller 42 against the cam 40. As shown, the cam 40 has a high lobe or portion 48 which swings the roller outwardly so as to rock the shaft 32 and move the supporting member 28 away from the stack of ice cream cones.

The illustrated cone feeding machanism 10 is also provided with second or lower supporting members 50 which are movable toward and away from the lowermost ice cream cone in the stack. It will be seen that the members 50 are engageable with the lowermost cone at a point approximately midway between the upper and lower ends of the cone. As shown, the members 50 take the form of two diametrically opposite curved bars which are mounted on the lower ends of arms 52. It will be seen that the arms 52 are secured to horizontal shafts 54, which are journaled in the bearing housings 34 and 36. Here again, the cams 40 may be employed to rock the shafts 54 so that the lower supporting members 50 will be swung away from the lowermost cone. As shown, a pair of arms 56 are secured to the shafts 54. Each arm 56 carries a roller 58 which is adapted to follow one of the cams 40. A spring 60 may be connected to each arm 56 so as to bias the roller 58 against the cam. The rollers 42 and 58 engage the cam 40 at angularly spaced points around the rotary axis of the cam, so that the lower and upper supporting members 50 and 28 are operated in sequence.

The supper supporting members 28 are adapted to support the second to the lowermost cone and the overlying stack, while the lowermost cone is being separated from the stack. The lower supporting members 50 are swung apart to permit the lowermost cone to drop into the conveyor 20. After the lower supporting members 50 have been returned to their original positions, the upper supporting members 28 are swung outwardly so that the stack of cones will drop downwardly in the magazine 14, until the lowermost cone is caught by the lower supporting members 50.

Means are provided to separate the lowermost cone from the stack by giving the lowermost cone a twist or turn about its own central vertical axis, while simultaneously exerting a downward force on the cone. The twisting of the lowermost cone effectively separates it from the stack.

The twisting action might be accomplished by various means, but in this case such twisting action is brought about by a plurality of grippers or jaws 64 which are adapted to engage the sides of the lowermost cone with a swiping motion. Such swiping motion preferably is downwardly inclined or helical in character, so that the lowermost cone is separated from the stack with a spiral or helical twist. Thus, the swiping motion has a peripheral component, as well as a downward component.

The jaws 64 are adapted to engage the lowermost cones at points spaced a considerable distance downwardly from the lip of the cone. Thus, the jaws 64 engage the cone at points where the cone is strong and highly resistant to breakage. In this case, there are two of the jaws 64 which engage the cone at diametrically opposite points. It will be seen that the jaws 64 are oriented at right angles to the lower supporting members 50. Thus, the diameter extending between the centers of the jaws 64 is perpendicular to the diameter extending between the centers of the lower supporting members 50.

The jaws 64 may assume various forms, but in this case they are fork-like in shape and are provided with a plurality of tines or teeth 66. It will be seen that the teeth 66 are adapted to bite into the wall of the lowermost cone to a slight extent, so that the jaws have a firm grip upon the cone.

Initially, the jaws 64 engage the lowermost cone as shown to best advantage in FIGS. 6 and 7. The initial positions of the jaws are shown in full lines. The jaws are moved peripherally and downwardly to the position shown in broken lines in FIGS. 6 and 7. It will be apparent that the movement of the jaws gives the cone a twist or spin, while simultaneously moving the cone downwardly.

Such motion is imparted to the jaws 64 by mounting them on the same supporting shafts 54 which operate the lower supporting members 50. Each of the jaws 64 is formed at the outer end of a spring blade or arm 68 which is mounted on an arm 70 which is formed integrally with one of the arms 52. Thus, the arm 70 is secured to the shaft 54. The spring arms 68 are curved and twisted in form, so that the jaws 64 are approximately horizontal in position, while the inner portions of the spring arms 68 are nearly vertical. The spring arms 68 are offset laterally in opposite directions from the arms 52, so as to pass along opposite sides of the lowermost ice cream cone in the stack.

The spring arms 68 provide a resilient biasing action to urge the jaws 64 toward the sides of the ice cream cone. At the same time, the spring arms are quite flexible so that they engage the fragile ice cream cone in a gentle manner.

When the shafts 54 are rocked, the jaws 64 are swung in arcs about the axes of the shafts. Initially, the jaws 64 are spaced horizontally and downwardly from the axes of the shafts 54. Thus, the movement of each jaw 64 has a downward component and a peripheral component, relative to the ice cream cone.

Additional means are provided to spread the jaws 64 apart as they are swung downwardly by the rocking movement of the shafts 54. This spreading movement releases the ice cream cone so that it may drop freely into the paper cup 22 on the conveyor 20. In this case, the jaws 64 are adapted to be spread by camming bars 74 (FIGS. 1 and 2) which are engaged by the spring arms 68. In this case, the camming bars 74 are conveniently formed on the arms 30 which support the upper cone supporting members 28. It will be seen from FIG. 2 that the camming bars 74 slant outwardly and downwardly so that the blades or arms 68 will be sprung outwardly as they are swung downwardly by the rocking movement of the shafts 54. As a result, the jaws 64 are spread apart, as clearly illustrated in FIGS. 6 and 7.

The mounting of the camming bars 74 on the upper supporting arms 30 has the additional advantage that the jaws 64 will be spread apart slightly as the upper supporting arms 30 are swung outwardly to permit the stack of ice cream cones to drop downwardly onto the lower supporting members 50. This spreading movement of the jaws 64 affords clearance for the downward movement of the stack. When the upper supporting members 28 are moved inwardly against the second to the lowermost cone, the jaws 64 move inwardly against the lowermost cone.

It may be helpful to summarize the operation of the cone feeding mechanism. The position of the mechanism shown in FIG. 3 may be considered to be the starting point in the cycle. It will be seen that the lowermost cone in the stack is being supported by the lower supporting members 50, while the second to the lowermost cone is being supported by the upper supporting members 28. The jaws 64 engage the lowermost cone, as clearly shown in FIG. 6. To release the lowermost cone from the stack, the shafts 54 are rocked by the cams 40 so as to swing the lower supporting members 50 away from the lowermost cone, as shown in FIG. 4. The rocking movement of the shafts 54 also imparts a swiping movement to the jaws 64, with respect to the ice cream cone, so that the jaws move peripherally as well as downwardly along inclined paths, as shown in FIGS. 6 and 7. Such movement of the jaws twists or spins the lowermost cone. This twisting movement greatly facilitates the separation of the lowermost cone from the stack. At the same time, the lowermost cone is moved downwardly so that it will drop into the paper cup 22 in the conveyor 20.

As the jaws 64 are swung downwardly, the camming bars 74 spring the blade 68 outwardly, so that the jaws are spread apart. This action is clearly indicated in FIGS. 2 and 6. The spreading movement of the jaws releases the cone so that it may be dropped freely into the conveyor.

Next, the lower supporting members 50 and the jaws 64 are returned inwardly to their original positions. The upper supporting members 28 are swung outwardly, as shown in FIG. 5, to permit the stack to drop downwardly until it is caught by the lower supporting members 50. The cycle is completed by returning the upper supporting members 28 inwardly until they engage the second to the lowermost cone, as shown in FIG. 3.

It will be apparent that the cone feeding mechanism of the present invention is very positive in its separating action, so as to give maximum assurance that the lowermost cone in the stack will be fed onto the conveyor. At the same time, the mechanism handles the cones in such a manner that breakage of the cones will virtually never occur. The mechanism is capable of feeding the cones at an extremely rapid rate. With all of these advantages, the cone feeding mechanism is durable and inexpensive in construction.

Various modifications, alternative constructions and equivalents may be employed without departing from the true spirit and scope of the invention, as exemplified in the foregoing description and defined in the following claims.

I claim:

1. In a mechanism for feeding ice cream cones one at a time from the bottom of a stack of cones, the combination comprising a magazine for receiving a stack of ice cream cones in an upright position, a pair of upper holding arms, upper pivot means supporting said upper holding arms for swinging movement toward and away from the stack below the magazine, said upper holding arms having padded members thereon engageable with the second to the lowermost cone in the stack adjacent but below the lip of said cone to support the overlying stack against downward movement, a pair of lower supporting arms, lower pivot means supporting said lower supporting arms for swinging movement toward and away from the lowermost cone in the stack at an intermediate point between the lip of the lowermost cone and the lower end thereof, said lower pivot means supporting said lower supporting arms for swinging movement about parallel substantially horizontal axes on opposite sides of the stack, said lower supporting arms having supporting members thereon engageable with the lowermost cone at diametrically opposite points along a diameter extending generally perpendicular to said axes, a pair of toothed jaws engageable with the lowermost cone in the stack at diametrically opposite points along a diameter generally parallel to said axes, said toothed jaws being engageable with the lowermost cone at points spaced downwardly from the lip thereof but spaced upwardly from the points of engagement of said supporting members on the lower supporting arms, said toothed jaws being mounted on the outer ends of spring members with their inner ends mounted on said lower supporting arms for outward and downward swinging movement therewith, said spring members resiliently biasing said toothed jaws against the lowermost cone but being flexible to provide for movement of said jaws away from the cone, means for effecting outward swinging movement of said lower supporting arms to move said supporting members thereon away from the lowermost cone while simultaneously imparting downward and outward swiping movement to said jaws with respect to the lowermost cone, said jaws thereby being effective to twist the lowermost cone about its own axis while simultaneously displacing the lowermost cone downwardly away from the stack, the overlying stack meanwhile being held by said padded members, said upper holding arms having cams thereon engageable by said spring members for moving said jaws away from the lowermost cone as said supporting members are swung outwardly so that the lowermost cone will be free to fall clear of said jaws, means for swinging the lower supporting arms inwardly to return said supporting members thereon to their original positions, means for swinging said upper holding arms outwardly for moving said padded members away from the stack so as to allow the stack to drop downwardly to bring the lowermost cone against said lower supporting members and also against said jaws, and means for swinging the upper holding arms inwardly to return said padded members to their original positions to support the stack.

2. In a mechanism for feeding ice cream cones one by one from the lower end of a stack, the combination comprising a magazine for holding a stack of ice cream cones in an upright position, a pair of upper supporting members movable against and away from the second to the lowermost cone in the stack for holding the stack against downward movement, a pair of jaws for engaging the lowermost cone in the stack at diametrically opposite points and at an intermediate level with respect to the upper and lower ends of the lowermost cone, and means for moving said jaws along inclined paths extending downwardly and peripherally relative to the lowermost cone so that said jaws will swipe against the lowermost cone and will twist the lowermost cone about its own axis so as to free it from the overlying stack.

3. In a mechanism for feeding cones one by one from the lower end of a stack of cones, the combination comprising a magazine for holding a stack of cones, a plurality of upper supporting members movable against and away from the second to the lowermost cone in the stack for holding the stack against downward movement, a pair of lower supporting members movable against and away from the lowermost cone in the stack, a pair of jaws engageable with the lowermost cone in the stack, means for imparting swiping movement to said jaws against the lowermost cone while simultaneously moving said lower supporting members away from the lowermost cone, said swiping movement having components extending downwardly and also peripherally with respect to the lowermost cone so as to twist the lowermost cone and thereby free it from the bottom of the stack for downward movement, means for returning said lower supporting members to their original positions, and means for moving said upper supporting members outwardly and then inwardly away from and back against the stack to permit the stack to drop downwardly against the lower supporting members.

4. In a mechanism for feeding the lowermost cone from a stack of cones, the combination comprising a magazine for holding a stack of cones in an upright position, upper supporting members movable against and away from the second to the lowermost cone in the stack for supporting the overlying stack against downward movement, a pair of lower supporting members movable against and away from the lowermost cone in the stack, said lowermost cone being engaged by said lower supporting members at diametrically opposite points, a pair of jaws engageable with the lowermost cone at diametrically opposite points along a diameter transverse to the diameter defined by the engagement of the lower supporting members with the lowermost cone, spring means mounting said jaws on said lower supporting members for movement therewith, means for moving said lower supporting members away from the lowermost cone while imparting swiping movement to said jaws relative to the lowermost cone, said swiping movement having a downward component and also a peripheral component to twist the lowermost cone about its own axis and thereby free the lowermost cone from the stack for downward movement, means for returning the lower supporting members to their original positions, and means for moving said upper supporting members outwardly and then inwardly away from and back against the stack to permit the stack to drop downwardly against the lower supporting members.

5. In a mechanism for feeding ice cream cones one by one from the lower end of a stack, the combination comprising means for receiving a stack of ice cream cones, a plurality of supporting members movable against and away from the second to the lowermost cone in the stack for holding the stack against movement, a plurality of jaws for gripping the lowermost cone in the stack, means for moving said jaws with downward and peripheral components so as to twist the lowermost cone about its own axis to free it from the overlying stack, means for returning said jaws to their original positions, and means for moving said supporting members away from and back against the stack to permit the stack to move downwardly against said jaws.

6. In a mechanism for feeding cones one by one from the lower end of a stack of cones, the combination comprising a magazine for receiving a stack of cones, a plurality of upper folding members movable against and away from the second to the lowermost cone in the stack, a plurality of lower supporting members movable against and away from the lowermost cone in the stack, a plurality of jaws engageable with the lowermost cone in the stack, means for imparting swiping movement to said jaws against the lowermost cone while simultaneously moving said lower supporting members away from the lowermost cone, said swiping movement having a downward component and also a component extending peripherally with respect to the lowermost cone so as to twist the lowermost cone and thereby free it from the bottom of the stack for downward movement, means for returning said jaws to their original positions, and means for moving said holding members away from and back against the stack to permit the stack to move downwardly against said jaws.

7. In a mechanism for feeding ice cream cones one by one from the lower end of a stack, the combination comprising a magazine for holding a stack of ice cream cones in an upright position, a plurality of upper supporting members movable against and away from the second to the lowermost cone in the stack for holding the stack against movement, a plurality of jaws for engaging the lowermost cone in the stack, means for moving said jaws along inclined paths extending downwardly and peripherally relative to the lowermost cone so that said jaws will swipe against the lowermost cone and will twist the lowermost cone about its own axis so as to free it from the overlying stack, means for spreading said jaws apart to release the cone, means for returning said jaws to their original positions, and means for moving said upper supporting members away from and back against the stack to permit the stack to move downwardly against said jaws.

8. In a mechanism for feeding ice cream cones one at a time from the bottom of a stack of cones, the combination comprising a magazine for receiving a stack of ice cream cones in an upright position, a pair of upper holding members, means supporting said upper holding members for swinging movement against and away from the second to the lowermost cone in the stack to hold the overlying stack against movement, a pair of lower supporting members, means supporting said lower supporting members for swinging movement against and away from the lowermost cone in the stack at diametrically opposite points, a pair of jaws engageable with the lowermost cone in the stack at diametrically opposite points along a diameter transverse to the diameter defined by the engagement of said lower supporting arms with said cone, said jaws being mounted on the outer ends of spring members which have their inner ends mounted on said lower supporting members for downward and outward swinging movement therewith, said spring members resiliently biasing said toothed jaws against the lowermost cone but being flexible to provide for movement of said jaws outwardly away from the cone, means for swinging said lower supporting members away from the lowermost cone while simultaneously imparting outward and downward swiping movement to said jaws with respect to the lowermost cone, said jaws thereby being effective to twist the lowermost cone about its own axis relative to the overlying stack while simultaneously displacing the lowermost cone downwardly away from the stack, the overlying stack meanwhile being held by the upper holding members, said upper holding members having cams thereon engageable by said spring members for moving said jaws away from the lowermost cone as the lower supporting members are swung outwardly so that the lowermost cone will be free to fall clear of said jaws, means for returning the lower supporting members inwardly to their original positions, means for swinging said upper holding members away from the stack so as to allow the stack to drop downwardly to bring the lowermost cone against said lower supporting members and said jaws, and means for returning the upper holding members inwardly to their original positions to support the stack.

References Cited in the file of this patent

UNITED STATES PATENTS

| | | |
|---|---|---|
| 1,963,621 | Geyer | June 19, 1934 |
| 2,349,523 | Sonnenberg | May 23, 1944 |